United States Patent [19]

Moore et al.

[11] Patent Number: 4,640,657
[45] Date of Patent: Feb. 3, 1987

[54] CARTON LOADING METHOD AND SYSTEM

[76] Inventors: Robert W. Moore, 664 Melrose Dr.; Michael J. Azzopardi, 215 E. Romie La., both of Salinas, Calif. 93901

[21] Appl. No.: 649,221

[22] Filed: Sep. 10, 1984

[51] Int. Cl.[4] .............................................. B65G 57/28
[52] U.S. Cl. ................................... 414/347; 414/786; 414/39; 414/392; 414/620; 414/641; 414/672
[58] Field of Search ...................... 414/28, 38, 39, 341, 414/345, 347, 620, 641, 672, 786, 348, 332, 399, 402, 391, 392

[56] References Cited

U.S. PATENT DOCUMENTS

| | | | |
|---|---|---|---|
| 2,468,326 | 4/1949 | Gleason | 414/641 |
| 2,808,157 | 10/1957 | Terrill | 414/347 |
| 3,788,496 | 1/1974 | Webb et al. | 414/39 |
| 4,268,201 | 5/1981 | Cayton | 220/1.5 X |
| 4,335,992 | 6/1982 | Reeves | 414/667 |
| 4,579,501 | 4/1986 | Fox | 414/622 X |

*Primary Examiner*—Frank E. Werner
*Attorney, Agent, or Firm*—Phillips, Moore, Lempio & Finley

[57] ABSTRACT

A method for loading a stack of filled cartons onto a transport vehicle includes lifting the cartons at the first station on a rotator lift truck and then rotating the cartons through an acute angle to cradle the cartons for carrying purposes. The cartons are then carried in their rotative position towards a second station, and again rotated to an upright position. The cartons are compressed at the second station and thereafter loaded onto the transport vehicle by a second lift truck. The rotator lift truck utilized for effecting the lifting, rotating, carrying and compressing steps includes a mast assembly mounted forwardly thereon and a rotator attachment mounted on the mast assembly for vertical movements and for rotation about a longitudinal axis thereof. The rotator attachment includes a pair of lift forks adapted to engage and lift one or more pallets having the cartons stacked thereon, a load backrest mounted adjacent to the mast assembly, and a load siderest mounted on a lateral side of the rotator attachment and disposed in perpendicular relationship relative to the load backrest and lift forks.

24 Claims, 12 Drawing Figures

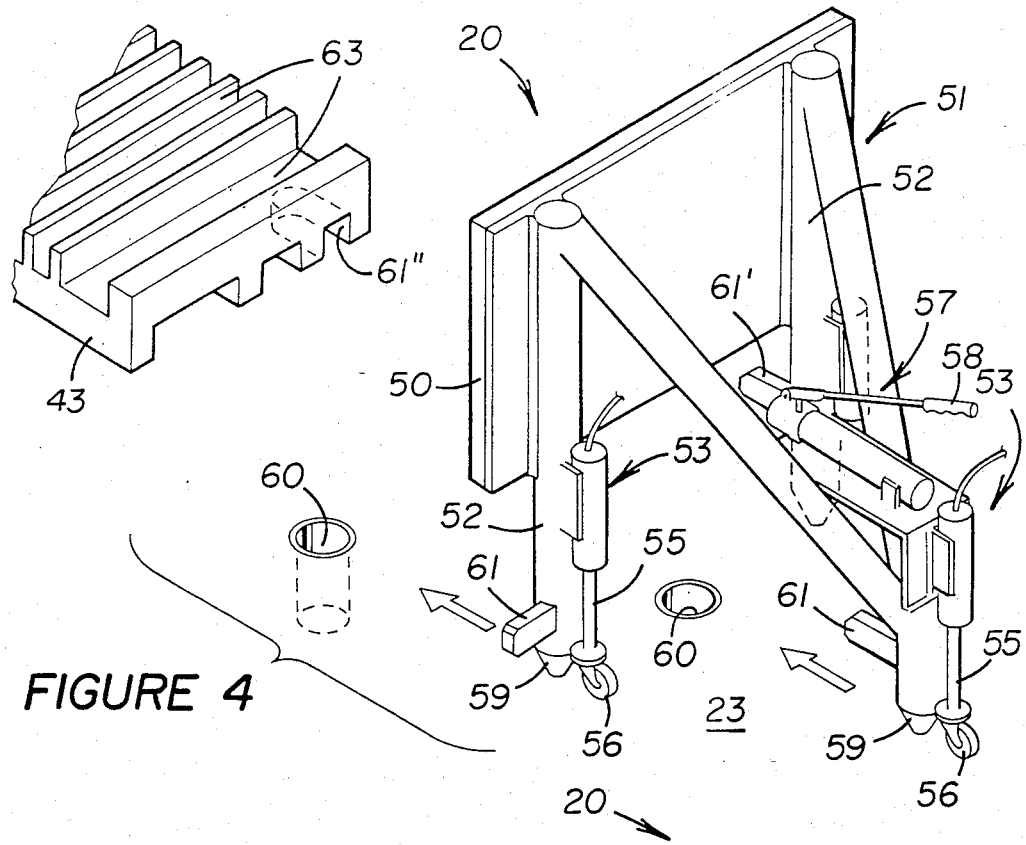
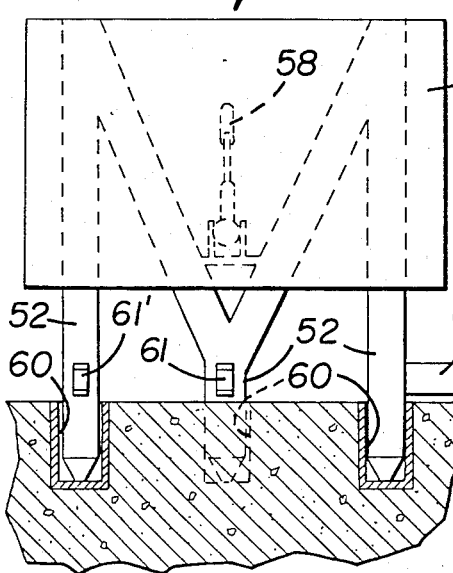
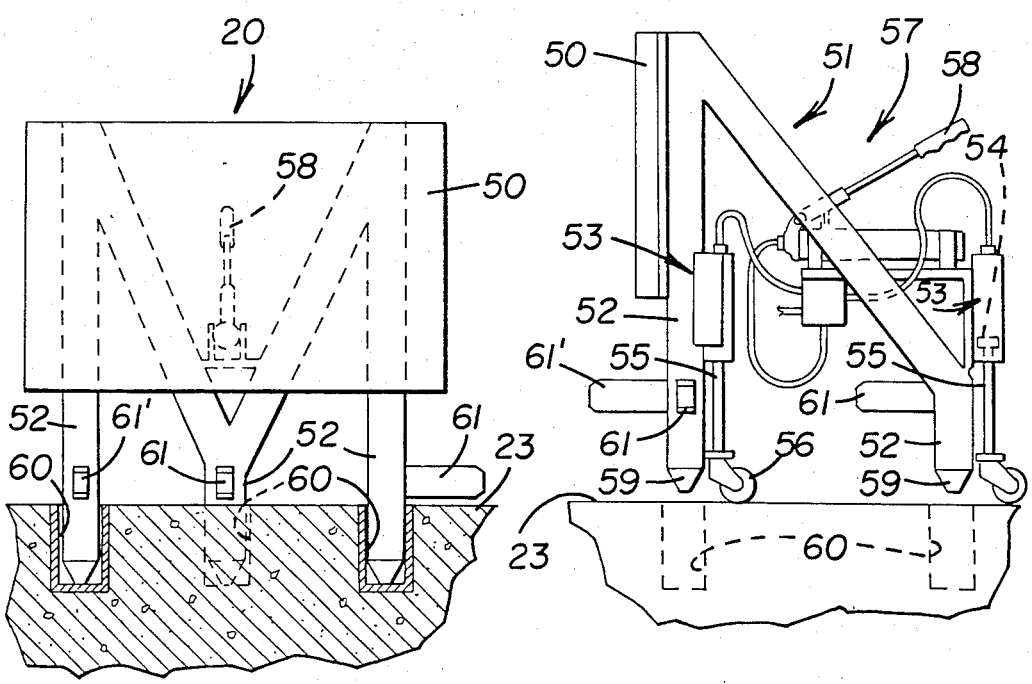
FIGURE 4
FIGURE 6
FIGURE 5

CARTON LOADING METHOD AND SYSTEM

TECHNICAL FIELD

This invention relates generally to a loading method and system and more particularly to the loading of a stack of filled cartons onto a transport vehicle.

BACKGROUND ART

The loading of filled lettuce cartons onto a transport vehicle, such as a truck-trailer or railroad freight car, gives rise to a common stacking problem primarily caused by the bulging tops and bottoms of the cartons. After the lettuce is harvested in the field, the lettuce heads are packaged into the cartons for subsequent processing through a cooling plant to maintain the lettuce heads at a sufficiently cool temperature to prevent decay thereof. The cartons are stacked onto pallets which are deposited in a loading and dock area for subsequent loading onto the transport vehicle.

U.S. Pat. No. 4,439,093, for example, discloses a conventional carton handling system for loading the lettuce cartons onto a truck-trailer in a loading and dock area. In particular, the system includes a straight line conveyor for moving the pallets and stacked cartons to a rotator apparatus which functions to receive a pair of pallets and stacked cartons and rotate them through ninety degrees while simultaneously squeezing the cartons. Thereafter, the forks of a standard lift truck are engaged under the stacked cartons to carry the cartons to the truck-trailer and a pallet removing apparatus functions to remove the empty pallets from the rotator apparatus.

Conventional systems of this type give rise to carton damage, spillage and related problems. In addition, a workman may be required for the purpose of holding and/or reloading the cartons on the forks of the lift truck when the lift truck carries the cartons from the rotator apparatus to the truck-trailer. The loading cycle is also prone to delays in that occasional pallet jam-ups and damage to the pallets and cartons may occur in the rotator and pallet removing apparatus.

Further, a substantially large loading area is required to accommodate the rather bulky and stationary rotator apparatus, conveyor and pallet removing apparatus which thus limits the number of companies enabled to use this type of conventional loading system. The complexity of the rotator apparatus and associated pallet removing apparatus also necessitates constant servicing and specially designed high voltage electrical hookups. In addition, seasonal moves of such apparatus to various locations requires that the apparatus be disassembled, shipped to its new location and reassembled, which gives rise to high labor and related costs.

U.S. Pat. Nos. 2,792,133; 2,822,933; 3,123,232; 3,190,461; 3,788,496; 4,037,734; and 4,051,958 disclose other types of conventional carton loading, stacking and related systems and apparatus that also give rise to one or more of the above-discussed prior art problems.

DISCLOSURE OF INVENTION

This invention overcomes the above, briefly described problems of the prior art by providing an efficient and economical carton loading method and system.

The method comprises the steps of lifting a stack of filled cartons, disposed in a first upright position, on a rotator lift truck at a first station, rotating the cartons through ninety degrees on the rotator lift truck to a second upright position at a second station remote from the first station, and loading the cartons onto a transport vehicle. In the preferred method of this invention, the steps further include partially rotating the cartons through an acute angle less than ninety degrees and carrying the cartons on the rotator lift truck in such partially rotative position to the second station, prior to the first-mentioned rotating step. In addition, the cartons are preferably compressed together at the second station.

The carton loading system includes the rotator lift truck, having a rotator attachment rotatably mounted forwardly thereon for rotation about a longitudinal axis thereof, with the rotator attachment including means for receiving, lifting and retaining at least one pallet and the cartons stacked thereon. In addition, a vertically disposed stop plate means is fixedly mounted at the second station for engaging and compressing the cartons on the rotator attachment.

The rotator lift truck further includes a mast assembly mounted forwardly thereon and the rotator attachment is mounted on the mast assembly for vertical movements and for rotation about the above-described longitudinal axis. The rotator attachment comprises lift means, such as forks, mounted on a lower end of the rotator attachment for engaging and lifting the pallet, a vertically disposed load backrest mounted adjacent to the mast assembly and having the lift means extending forwardly therefrom, and a vertically disposed load siderest mounted on a first lateral side of the rotator attachment and being further disposed in perpendicular relationship relative to the load backrest and the lift means. The rotator attachment is otherwise open at its top side, frontal side and a second lateral side opposite to its first lateral side.

The method and system of this invention enables a company to utilize a relatively small loading and dock area and eliminates the need for stationary loading apparatus of the type used in conventional methods and systems of the type described above. Standard field loads and pallets are utilized with the pallets being adapted for placement at ground level in the loading and dock area whereby they can be lifted, rotated, transported and loaded onto the transport vehicle expeditiously. The method and system ensures reduced spillage and carton and pallet damage and eliminates the need for a workman to hold or replace the cartons on the rotator lift truck during the loading cycle. The system also ensures that the pallets are handled and stacked in a trouble-free and precise manner for subsequent use. The mobility of the system further ensures that it can be transported to another job site expeditiously and at minimal cost.

BRIEF DESCRIPTION OF THE DRAWINGS

Other objects and advantages of this invention will become apparent from the following description and accompanying drawings wherein:

FIG. 4 is an isometric view illustrating a mobile stop plate apparatus of the system, adapted to be fixedly mounted on a loading dock adjacent to a transport vehicle;

FIG. 5 is a side elevational view of the stop plate apparatus, prior to its mounting on the loading dock;

FIG. 6 is a front elevational view of the stop plate apparatus, showing it fixed in place on the loading dock.

BEST MODE OF CARRYING OUT THIS INVENTION

Figure 1:
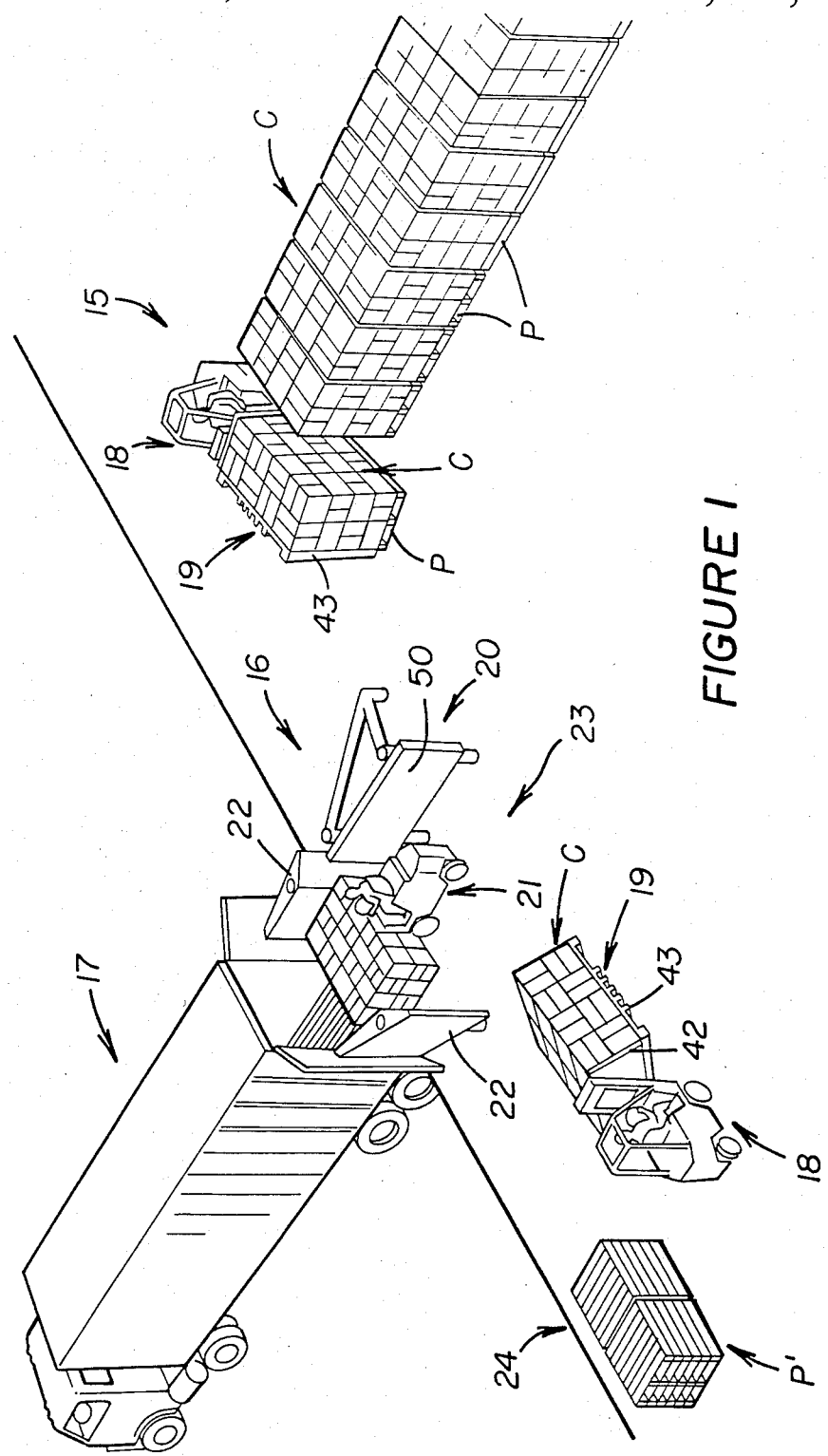
FIG. 1 schematically illustrates a general view of the loading system of this invention.

General description (FIG. 1)

FIG. 1 schematically illustrates a loading system wherein standard pallets P each have a plurality of cartons C stacked thereon in a conventional manner to assume a first upright position at a transfer or first station 15. The method and system of this invention are particularly adapted for use with cartons having lettuce heads packed therein which normally gives rise to stacking and related problems due to the bulging-out of the tops and bottoms of the cartons, primarily due to the irregular configurations of the lettuce heads. As discussed above, after the lettuce is harvested in the field, the lettuce heads are packaged into cartons C and stacked on pallets P for subsequent processing through a cooling plant (not shown) to maintain the lettuce heads at a sufficiently cool temperature to prevent decay thereof.

Thereafter, and as shown in FIG. 1, the pallets and cartons are deposited at first station 15 of a loading and dock area for transfer to a loading or second station 16 and subsequent loading into a transport vehicle 17. Although the transport vehicle is shown in the form of a truck-trailer, it should be understood that other types of transport vehicles could be used, such as railroad freight cars. As will be understood more fully hereinafter, the carton loading method and system of this invention substantially reduce the loading cycle time over that of conventional loading methods and systems and also substantially reduces the likelihood of carton spillage and damage to the cartons and pallets.

As shown in FIG. 1, the loading system further includes a rotator lift truck 18 having a rotator attachment 19 mounted forwardly thereon. The rotator lift truck, sequentially shown in a loading and rotative position, is adapted to receive, lift and retain one or more pallets P thereon. In common practice, lift truck 18 is designed to lift a pair of pallets each having 30 or 32 cartons stacked thereon with the ends and tops of the cartons being alternately staggered to aid in the stacking process in the well-known manner. Lift truck 18 then prerotates and cradles the cartons and carries the cartons in their rotative position towards second station 16.

Figure 11:
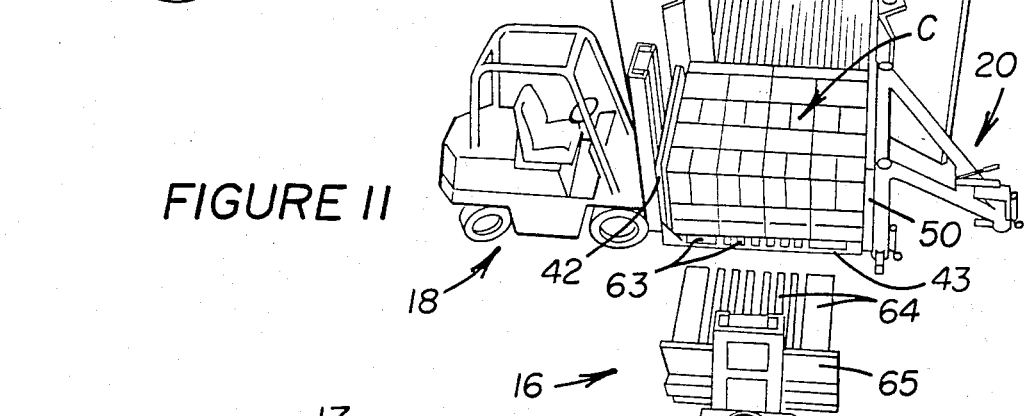
Figure 12:
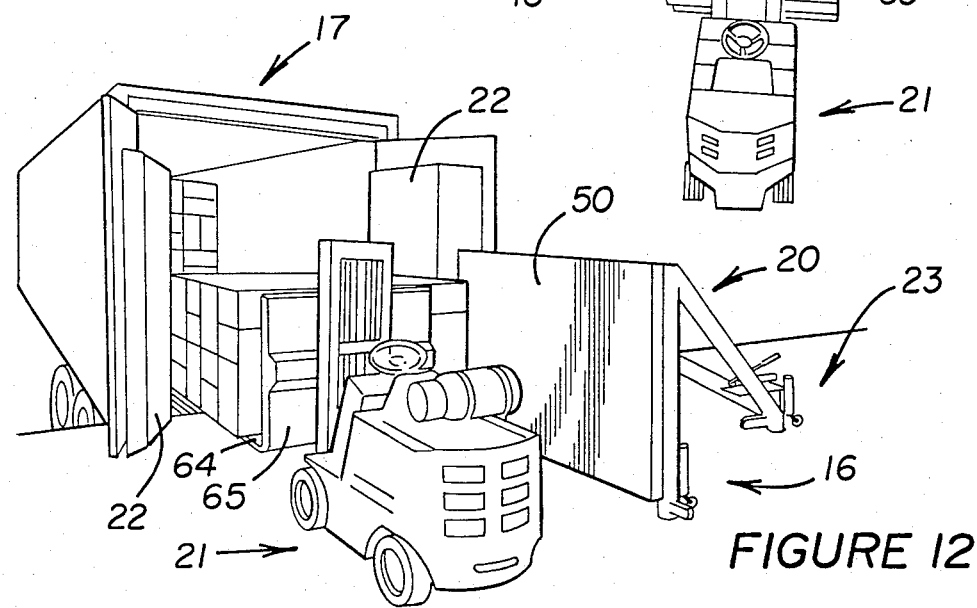

The rotator attachment, shown in its unloading position in FIG. 11, then functions to fully rotate the cartons to a second upright position at the second station (90° from the originally stacked first upright position at station 15) whereafter the cartons are compressed against a vertically disposed stationary stop plate apparatus 20. It should be noted that the width of each carton stack at station 15, across the front of lift truck 18, is approximately one-half the height of the cargo space in truck-trailer 17. Thus, the 90° rotation of the load on lift truck from station 15 to station 16 will facilitate the stacking of two loads on each other in the cargo space (FIG. 12).

The cartons are lifted and removed from the rotator attachment of vehicle 18 by a second lift truck 21. The cartons are then moved between and through a pair of standard squeeze doors 22, mounted in a stationary manner on a concrete loading dock 23, and into the cargo space of truck-trailer 17. The loading cycle is repeated until such cargo space is filled or at least partially filled to its desired capacity.

When lift truck 21 engages beneath and lifts the stack of cartons for loading into truck-trailer 17, lift truck 18 backs-away from station 16 to thereafter deposit the two empty pallets P at a third station 24. In particular, rotator attachment 19 is again rotated between stations 16 and 24 to move the pallets from a vertically disposed position to a horizontally disposed position, adjacent to ground level at station 24. The pallets are raised in place on the stack of empty pallets P' at station 24 and a pair of forks 25 of lift truck 18 (FIG. 2) are removed from the pallets.

DETAILED DESCRIPTION

Figure 2:
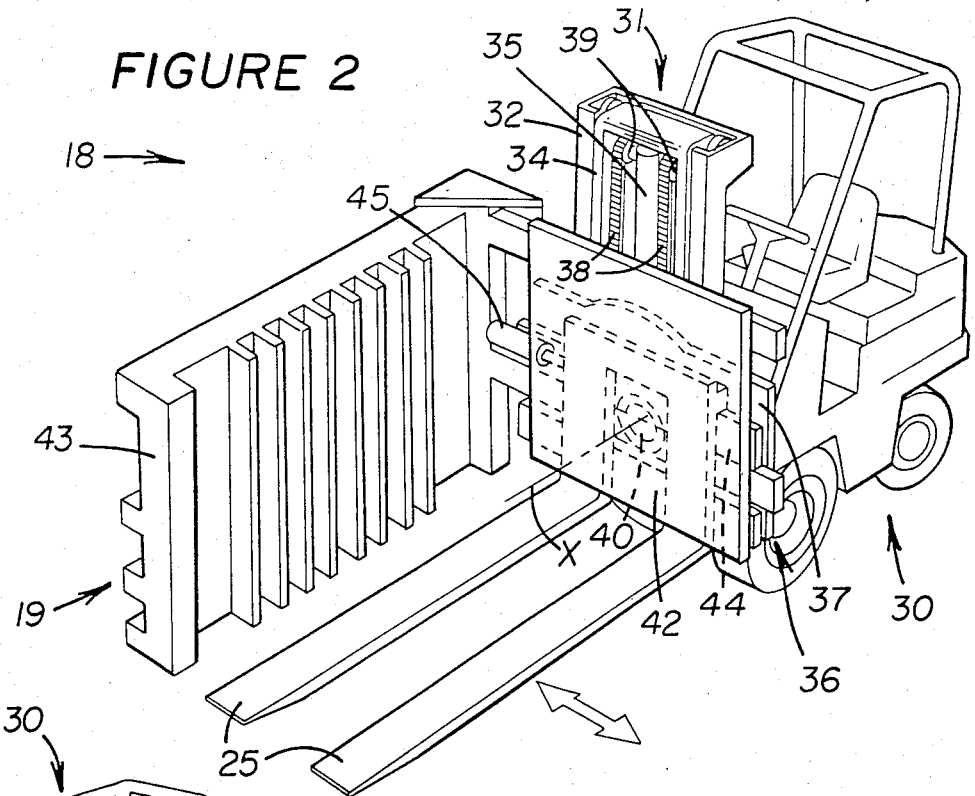
FIG. 2 is an isometric view illustrating a rotator lift truck of the system, having a rotator attachment thereof shown in a loading position of operation.
Figure 3:
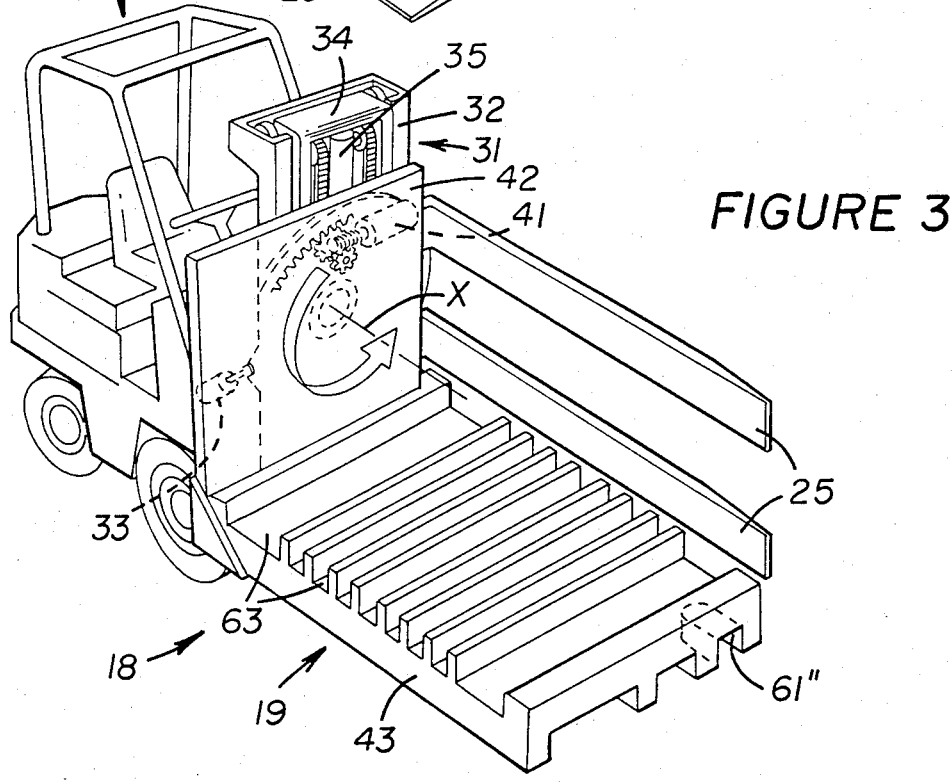
FIG. 3 is an isometric view of the rotator lift truck, showing its rotator attachment in an unloading position of operation.

Rotator Lift Truck 18 (FIGS. 2 and 3)

FIG. 2 illustrates rotator lift truck 18 in its loading position of operation wherein forks 25 are disposed horizontally adjacent to ground level for reception within the standard slots of a pallet. FIG. 3 illustrates the lift truck with rotator attachment 19 rotated 90° about a longitudinal and rotational axis X thereof to rotate the forks to a vertically disposed position at the unloading position of the rotator attachment at station 16 (FIG. 1). The lift truck further comprises a standard mobile truck 30 having a telescoping mast assembly 31 mounted forwardly thereon in a conventional manner.

As is well known in the art, the mast assembly includes an upright fixed mast 32 having its lower end pivotally mounted (not shown) on a frame of the truck for forward and rearward tilting movements under control of a pair laterally spaced standard tilt cylinders 33 (one cylinder shown in FIG. 3), each pivotally interconnected between a frame of the truck and fixed mast 32. A standard tilt cylinder arrangement of this type is disclosed in U.S. Pat. No. 2,599,524, incorporated herein by reference. The mast assembly further comprises a movable mast 34 reciprocally mounted on fixed mast 32 under control of a centrally disposed double-acting hydraulic cylinder 35, interconnected between the two masts in a conventional manner.

A carriage assembly 36, comprising a mounting plate 37, is reciprocally mounted on movable mast 34, also in a conventional manner. A pair of laterally spaced chains 38 are each entrained over a sheave 39, rotatably mounted on movable mast 34, and have opposite ends thereof anchored to mounting plate 37 of the carriage assembly and fixed mast 32, respectively. Thus, selective extension of lift cylinder 35 will raise movable mast 34 relative to fixed mast 32 and also raise carriage assembly 36 relative to the movable mast in a conventional manner. Since the specific details of the above component parts of the mast and carriage assemblies are well known to those skilled in the lift truck arts, further explanation thereof is unnecessary for a full understanding of the invention disclosed and claimed herein.

Rotator attachment 19 is attached to mounting plate 37 of the carriage assembly for vertical reciprocal movements therewith and for rotation about longitudinal and rotational axis X, relative to the mounting plate. As schematically illustrated in FIG. 3, the rotator attachment is rotatably mounted on a stub-shaft 40 secured on mounting plate 37 and is adapted to be rotated through a maximum angle of 90° about axis X under control of a fluid motor 41. The motor is connected in a conventional manner, along with associated gear mechanisms (not fully shown), between the mounting plate and a vertically disposed load backrest 42, having forks 25 suitably mounted thereon for simultaneous rotational movement therewith.

Since the details of typical actuating mechanisms, for rotating the rotator attachment on carriage assembly 36 are well-known to those skilled in the lift truck arts, further explanation thereof is unnecessary for a full understanding of this invention. However, various rotator attachments of this type are exemplified by those disclosed in U.S. Pat. Nos. 3,198,023; 3,143,233; 3,039,631; 2,623,654; 2,599,524; 2,473,659; and 2,411,263, the disclosures of which are incorporated herein by reference. U.S. Pat. No. 2,599,524, for example, discloses a rotator attachment wherein a fluid motor corresponding to motor 41 sequentially drives a worm gear, a pinion and a large internal gear secured to a member corresponding to load backrest 42.

As shown in FIG. 2, the rotator attachment further comprises a vertically disposed load siderest 43 secured on a backside of load backrest 42 and mounted on a first lateral side of the rotator attachment. The load siderest is continuously disposed in perpendicular relationship relative to load backrest 42 and a horizontal plane containing lift forks 25 at all rotative positions of the rotator attachment. The rotator attachment is otherwise open on its top side, frontal side and a second lateral side, opposite to side backrest 43, to adapt it for the carton lifting, carrying and depositing functions hereinafter more fully described. It should be noted that load siderest 43 has a plurality of channels or slots (nine shown) defined on an inner side thereof to receive a like number of forks of lift truck 21 (FIG. 1), as described more fully hereinafter.

To facilitate insertion of the forks into the pallet, removal of the pallet after loading and since stacks of cartons are occasionally found to be leaning and "off center," it has proven desirable to equip rotator attachment 19 with means for selectively side-shifting forks 25. As schematically illustrated in FIG. 2, the forks may be slidably mounted for lateral movement on a cross-bar 44, secured to load backrest 42, and one or more double-acting hydraulic cylinders 45 can be suitably mounted between the frame of the rotator attachment and the forks to effect this side shift function. Further details of a side shift apparatus of this type may be found in U.S. Pat. No. 4,335,992, for example. The disclosure of this patent is also incorporated by reference herein.

Stop Plate Apparatus 20 (FIGS. 4–6)

FIGS. 4–6 illustrate details of mobile stop plate apparatus 20. As shown, the apparatus includes a vertically disposed stop plate 50 suitably secured on a frame 51. The frame is in the form of a tri-pod having three upstanding legs 52 with each of the legs having a single-acting air or hydraulic extensible cylinder 53 secured thereto. As illustrated in FIG. 5, each of the cylinders has a piston 54 reciprocally mounted therein and attached to a rod 55, having a universal caster or roller 56 rotatably mounted on the lower end thereof. A standard control system 57, including a handle 58, is suitably connected to each of the cylinders to normally pressurize the head ends thereof to extend casters 56 downwardly beyond the lower end of a respective leg 52 and into engagement with the concrete surface of loading dock 23.

Thus, the stop plate apparatus is adapted to be rolled on the loading dock (FIG. 1) to have a lower tapered end 59 of each leg 52 centered over a respective mounting hole 60, formed in the loading dock (FIG. 5). When the legs are centered over their respective mounting holes, actuation of handle 58 will simultaneously depressurize the head ends of cylinders 53 to retract rods 55 to thus permit the legs to drop under the influence of gravity into locked engagement within respective mounting holes 60. Conversely, simultaneous pressurization of the head ends of the cylinders will extend rods 55 to release each leg 52 from its mounting hole whereby the stop plate apparatus again becomes mobile and can be moved on casters 56.

A stop 61 is welded or otherwise suitably secured at a predetermined distance above the lower end of each leg to engage the loading dock to positively position the leg into a respective mounting hole 60 and stop plate 50 at its desired elevation above the loading dock. It should be noted in FIG. 4 that a cut-out 61" is formed in a die of load siderest 43, fronting stop plate apparatus 20. The cut-out is adapted to receive a stop 61' of stops 61 to limit the compressive load imposed on the cartons, as described hereinafter.

Carton Loading Method (FIGS. 7–12)

FIGS. 7–12 illustrate detailed method steps for effecting the carton loading method. As shown in FIG. 1, a predetermined number of cartons C, such a standard stack of 30 or 32 cartons are stacked on each pallet P in a first upright position with rotator lift truck 18 adapted to lift two pallets and thus 60 or 64 cartons during each loading cycle. As discussed above, the pallets and cartons are deposited at ground level on the loading dock at station 15 upon their arrival from a cooling plant (not shown) whereat the lettuce heads contained in the cartons are cooled to a sufficiently low temperature to prevent decay thereof.

Figure 7:
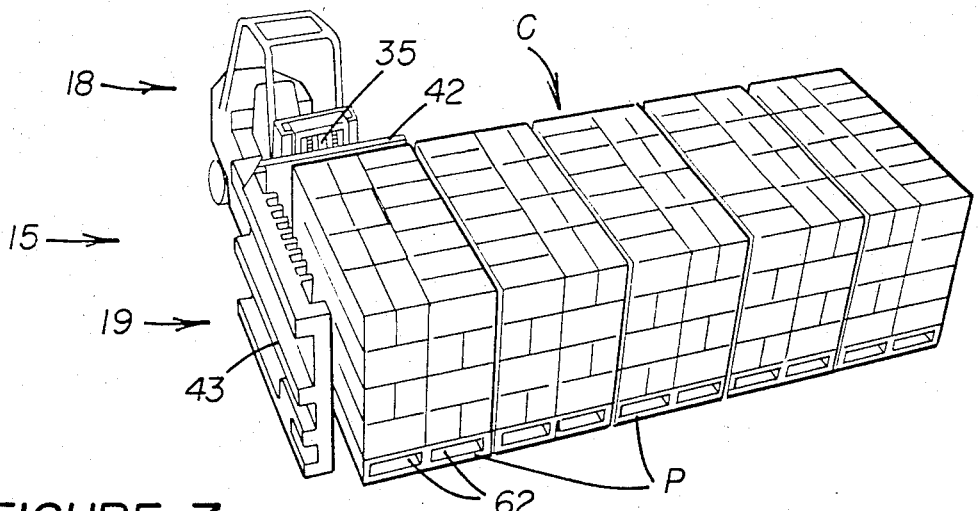
FIGS. 7-12 sequentially illustrate method steps employed during the carton loading method of this invention.
Figure 8:
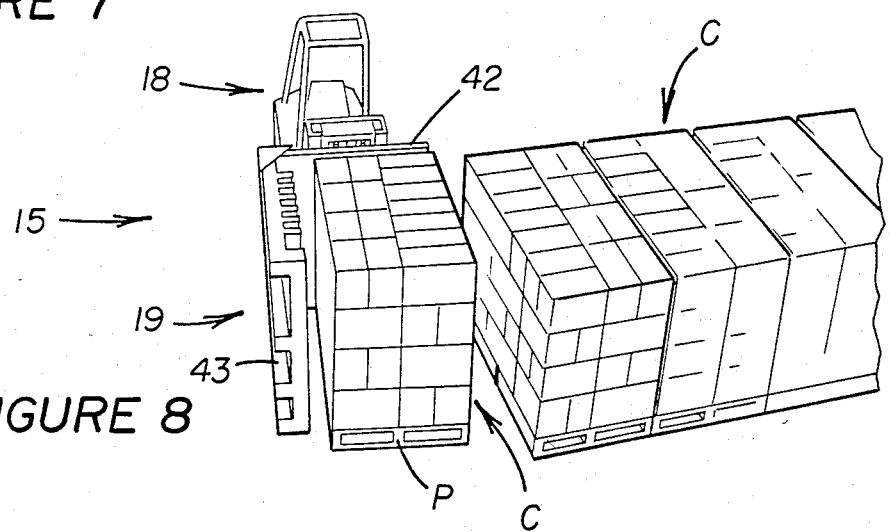
Figure 9:
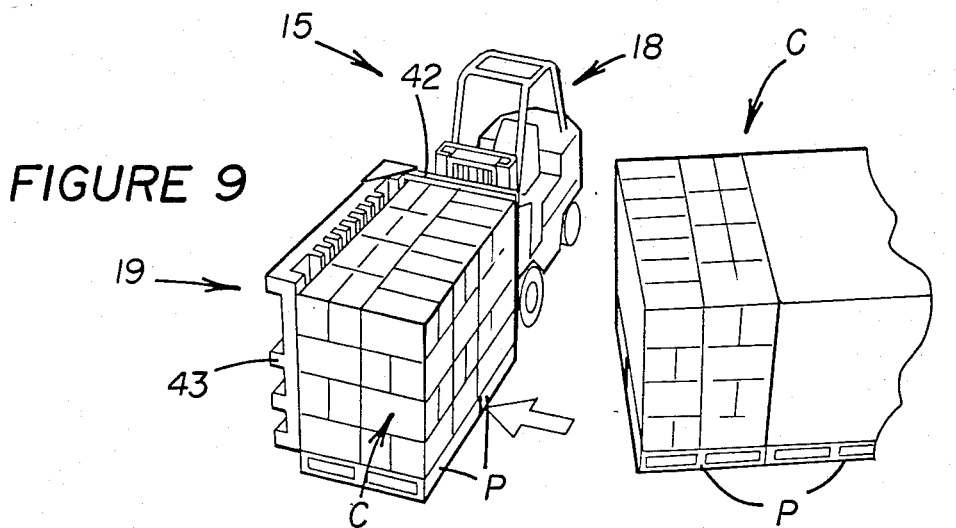

Cylinder 45 (FIG. 2) is extended to sideshift lift forks 25 away from load siderest 43 and the forks are inserted into the aligned slots of two pallets, the pallets being arranged in tandem (FIGS. 7 and 8). Forward movement of load backrest 42 against the backside of the cartons will tend to compress the cartons together slightly, e.g., one to two inches. Rotator attachment 19 is thus positioned to dispose load siderest adjacent to an outer lateral side of the pallets and cartons in a generally vertically disposed position.

Upon extension of lift cylinder 35 to lift the pallets, the pallets will normally be simultaneously tilted backwards slightly to shift the backsides of the pallets and cartons rearwardly against load backrest 42, under control of retracted tilt cylinders 33 (FIG. 3). In addition, the pallets are side-shifted towards load siderest 43, as indicated by the arrow in FIG. 9, to engage the cartons therewith and to place them in an upright position, under control of side shift cylinder 45 (FIG. 2). Lift cylinder 35 may then be further extended to lift the pallets and cartons to a desired distance above ground level for transport purposes, as further shown in FIG. 9.

Figure 10:
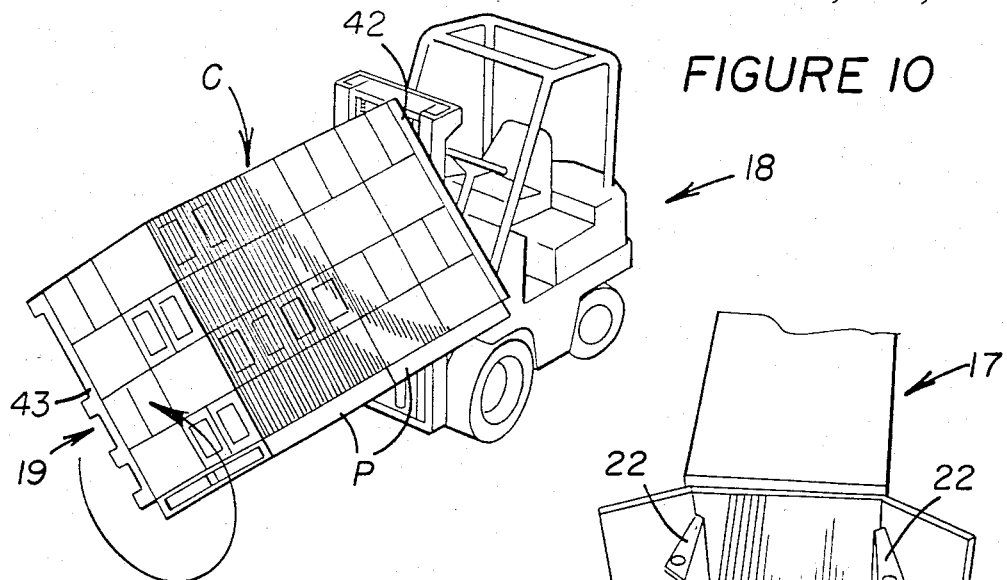

As shown in FIG. 10, the pallets are then prerotated by energizing 41 (FIG. 3) through an acute angle substantially less than 90° (preferably to an acute angle selected from the range of approximately 30° to 60° and still more preferably to an acute angle approximating 45°) to firmly crowd and cradle the cartons against load siderest 43 to insure against spillage of the cartons. The influence of gravity will, of course, aid in this crowding function and will also aid in crowding the cartons against load backrest 42 when the pallets and cartons are tilted rearwardly upon retraction of tilt cylinder 33 (FIG. 3). The cartons are then preferably carried to second station 16 at loading dock 23 in this rotative position (FIG. 1).

As shown in FIG. 11, when rotator lift truck 18 arrives at station 16, it positions the cartons in a second upright position by fully retracting cylinder 41 to rotate rotator attachment 19 to dispose load siderest 43 horizontally on the loading dock and transversally relative to the cargo space of truck-trailer 17. Thus, the cartons are fully rotated through a maximum angle of 90° from station 15 to final loading station 16. When the operator of lift truck 18 has the cartons approximately centered with the frontal side of stop plate 50 of stop plate apparatus 20, he will then move the vehicle towards the stop plate a predetermined amount to compress the cartons together to adapt them for the final loading step. The maximum compressive load imposed on the cartons is closely controlled when stop 61' "bottoms-out" in aligned slot 61", formed on the facing side of load siderest 43 (FIG. 4).

It should be understood that the lower edge of stop plate 50 is positioned slightly above the upper side of load siderest 43, which is now disposed horizontally at ground level, so that the stop plate will only abut and compress the cartons. Thus, compression of the cartons (e.g., squeezed together approximately three inches) between the parallel load backrest 42 and stop plate 50 in FIG. 11 will function to compress and align the cartons for final loading into the truck-trailer and between squeeze doors 22 which are positioned to diverge outwardly from the truck-trailer, towards the cartons, in a conventional manner to aid in the loading function.

As shown in FIGS. 3 and 11, the inner side of load siderest 43 has a plurality of transversely disposed and longitudinally spaced slots 63 formed therethrough for receiving a like number and similarly configured forks 64 of lift truck 21. The forks are sufficiently closely spaced to engage beneath the cartons without inducing any tilting and subsequent spillage of the cartons during the final loading step, i.e., the separation distance between each adjacent pair of forks is substantially less than the length or width of a supported carton C. Lift truck 21 is otherwise constructed as a conventional lift truck, having a standard load backrest 65 secured on a vertically movable carriage assembly thereof in a conventional manner. Thus, in the final loading procedure, the operator will move lift truck 21 forwardly towards the stacked cartons in FIG. 11 to engage forks 64 within slots 63 and lift the cartons C off load siderest 43 of lift truck 18.

The operator of lift truck 18 will then back-away from the cartons to relieve the compressive forces imposed thereon and to disengage load siderest 43 from thereunder. Lift truck 21 is thus free to lift the cartons and load them into the cargo area of the truck-trailer in a conventional manner, as shown in FIG. 12. Referring once again to FIG. 1, the operator of lift truck 18 is thus enabled to rotate rotator attachment 19 90° to its starting position (FIG. 2) sideshift forks 25 and thus the two pallets away from the load siderest by extending cylinder 45, and stack the empty pallets onto a stack of pallets P' for subsequent use. The operator of lift truck 18 is further enabled to return to station 15 to repeat the loading cycle. It is contemplated that the loading system will normally include two rotator lift trucks 18 and only one lift truck 21 to maximize loading efficiency and minimize loading cycle time.

We claim:

1. A method for loading a stack of filled cartons, normally positioned on a loading dock to define a top, front and back sides, first and second lateral sides and a bottom on said stack, onto a transport vehicle comprising the steps of
   lifting said cartons in a first upright position at a first station by a rotator lift truck having a rotator attachment adapted to rotate about a longitudinal and rotational axis thereof,
   rotating said cartons through 90° about said axis to a second upright position by said rotator lift truck to position the top of said stack on a lateral side of said truck, and
   loading said cartons into a cargo space of said transport vehicle at a second station, including the steps of moving said rotator lift truck adjacent to said transport vehicle with said cartons maintained in said second upright position adjacent to the cargo space of said transport vehicle, moving another lift truck transversely relative to the longitudinal axis of said rotator attachment and towards the repositioned top of said cartons, and lifting said cartons by said last-mentioned lift truck directly from said rotator lift truck and loading said cartons into the cargo space of said transport vehicle.

2. The method of claim 1 further comprising
   prerotating said cartons through an acute angle substantially less than 90° to a rotative position on said rotator lift truck after said lifting step, and
   carrying said cartons in said rotative position towards said second station and then rotating said cartons through said 90°.

3. The method of claim 2 further comprising compressing said cartons at said second station.

4. The method of claim 3 further comprising stacking said cartons on at least one pallet prior to said lifting step and wherein said lifting step comprises engaging lift means of said rotator lift truck under said pallet and cartons and raising said lift means.

5. The method of claim 4 wherein said prerotating step comprises rotating said lift means and said pallet through an acute angle selected from the range of from approximately 30° to 60°.

6. The method of claim 5 wherein said prerotating step comprises rotating said lift means and said pallet through an acute angle approximating 45°.

7. The method of claim 4 further comprising engaging a backside of said cartons with a vertically disposed load backrest and engaging a lateral side of said cartons with a vertically disposed load siderest further disposed in perpendicular relationship relative to said load backrest and said lifting means and wherein said prerotating step comprises rotating said lift means to crowd said cartons towards said load siderest under the influence of gravity.

8. The method of claim 7 further comprising tilting said lift means to tip said pallet and said cartons towards said load backrest under the influence of gravity.

9. The method of claim 7 further comprising simultaneously side-shifting said lift means, said pallet and said cartons laterally towards said load siderest.

10. The method of claim 7 wherein said rotating step comprises rotating said lift means and said pallet to a vertically disposed position and simultaneously rotating said load siderest to a horizontally disposed position.

11. The method of claim 10 wherein said compressing step comprises compressing said cartons between said load backrest and a vertically disposed stationary stop plate further disposed in parallel relationship relative to said load backrest at said second station.

12. The method of claim 11 further comprising relieving compressive forces imposed on said cartons by said load backrest and said stop plate and wherein said loading step comprises lifting said cartons and placing them in said transport vehicle.

13. The method of claim 3 wherein said compressing step comprises controlling the maximum compressive load imposed on said cartons.

14. A carton loading system comprising
a first station adapted to receive at least one pallet having a plurality of cartons stacked thereon,
a rotator lift truck having a rotator attachment rotatably mounted forwardly thereon for rotation about a longitudinal axis thereof, said rotator attachment including means for receiving, lifting, retaining and rotating said pallet and cartons thereon generally 90° from a first to a second upright position,
a second station adapted to receive said rotator lift truck,
a vertically disposed stationary stop plate means positioned transversely relative to the longitudinal axis of said rotator attachment and fixedly mounted at said second station for engaging and compressing all of said cartons simultaneously on said rotator attachment and
lift truck means for entering said second station transversely of the longitudinal axis of said rotator attachment and towards said cartons when they are retained in their second upright position on said rotator lift truck and for thereafter lifting said cartons directly from said rotator lift truck and loading said cartons into a cargo space of a transport vehicle.

15. The carton loading system of claim 14 wherein the means of said rotator attachment comprises
lift means mounted on a lower end of said rotator attachment for engaging and lifting said pallet,
a vertically disposed load backrest having said lift means extending forwardly therefrom, and
a vertically disposed load siderest mounted on a first lateral side of said rotator attachment and being further disposed in perpendicular relationship relative to said load backrest and said lift means, said rotator attachment being otherwise open at its top side, frontal side and a second lateral side opposite to said first lateral side.

16. The carton loading system of claim 15 further comprising tilt means for tilting said rotator attachment forwardly and rearwardly on said rotator lift truck.

17. The carton loading system of claim 15 wherein said lift means comprises a plurality of horizontally disposed forks extending forwardly on said rotator lift truck and further comprising means for side-shifting said forks on said rotator attachment and laterally relative to said longitudinal axis.

18. The carton loading system of claim 15 wherein said load siderest has a plurality of transversely disposed and parallel slots formed therethrough and on an inner side thereof adapted to receive forks of a lift truck therein.

19. The carton loading system of claim 14 wherein said stop plate means comprises a vertically disposed stop plate, a plurality of upstanding legs secured to said stop plate and means for raising and lowering said legs relative to ground level.

20. The carton loading system of claim 19 wherein said last-mentioned means comprises a fluid-actuated extensible cylinder secured to each of said legs.

21. The carton loading system of claim 20 wherein each said cylinder comprises a reciprocal rod having a ground-engaging roller rotatably mounted on a lower end thereof.

22. The carton loading system of claim 19 further comprising a loading dock having a plurality of mounting holes formed therein and each positioned to receive a lower end of a respective one of said legs therein when said legs are lowered relative to ground level.

23. The carton loading system of claim 22 further comprising stop means secured at a predetermined distance above the lower end of at least one of said legs for engaging said loading dock when such leg is in its lowered position.

24. The carton loading system of claim 14 further comprising means on said rotator attachment and said stop plate means for controlling the maximum compressive load imposed on said cartons.

* * * * *